United States Patent [19]

Kunze

[11] 4,294,340

[45] Oct. 13, 1981

[54] OVERLOAD CLUTCH

[75] Inventor: Dieter Kunze, Siegburg, Fed. Rep. of Germany

[73] Assignee: Jean Walterscheid GmbH, Siegburg, Fed. Rep. of Germany

[21] Appl. No.: 96,425

[22] Filed: Nov. 21, 1979

[30] Foreign Application Priority Data

Dec. 9, 1978 [DE] Fed. Rep. of Germany ....... 2853293

[51] Int. Cl.³ .......................... F16D 7/02; F16D 43/20
[52] U.S. Cl. ...................................... 192/56 R; 64/29
[58] Field of Search ................ 192/56 R; 64/28 R, 29

[56] References Cited

U.S. PATENT DOCUMENTS

| | | | |
|---|---|---|---|
| 2,712,372 | 7/1955 | Seusa | 192/56 R |
| 3,263,451 | 8/1966 | Reimer | 64/29 |
| 3,774,738 | 11/1973 | Steinhagen | 64/29 X |
| 4,075,873 | 2/1978 | Geisthoff | 64/29 |

FOREIGN PATENT DOCUMENTS

| | | |
|---|---|---|
| 1911309 | 12/1964 | Fed. Rep. of Germany . |
| 1283040 | 2/1969 | Fed. Rep. of Germany . |
| 2459947 | 12/1974 | Fed. Rep. of Germany . |
| 2526212 | 1/1976 | Fed. Rep. of Germany . |
| 144166 | 3/1931 | Switzerland ............................ 64/29 |

Primary Examiner—Rodney H. Bonck
Attorney, Agent, or Firm—Toren, McGeady and Stanger

[57] ABSTRACT

An overrunning clutch including a driving member, a driven member, clutch engagement members rotatably held in apertures formed through one of the driving and driven members and first recesses formed in the other of said driving and driven members wherein the clutch engagement members engage to effect clutch torque transmission, is structured to include a control ring having second recesses formed therein, with the control ring being held by a circumferentially-acting spring in a first position, representing the clutch engaged position, and being movable to a second position representing the clutch disengaged or overrunning position. The clutch engagement members are held by an axial spring in frictional engagement between the control ring and the other of the driving and driven members containing the first recesses and when the torque transmission through the clutch exceeds a predetermined nominal value, rolling motion of the clutch engagement members operates by frictional contact to cause the control ring to move against the circumferentially-acting spring into its second position whereby the engagement members enter the second recesses and whereby the clutch begins to overrun.

11 Claims, 9 Drawing Figures

OVERLOAD CLUTCH

The invention relates generally to clutch devices and more particularly to an overload clutch particularly useful with universal joint shafts for driving agricultural implements through the power take-off shaft of a tractor.

Clutches of the type to which the present invention relates generally consist of a driving and a driven clutch member, with the driven clutch member being constructed, for example, as a clutch hub having circumferentially distributed apertures in which rolling torque transmission bodies are held. These bodies engage in recesses of one or the other clutch member for torque transmission and a control ring is held in a torque-transmitting position by means of springs which act in the circumferential direction. During torque transmission, the transmission bodies are supported through the control ring against the force of an axial spring which is held between two stop elements.

A ratchet clutch for limiting transmitted torque for example, from a drive motor, is known from German Utility Model 1,911,309. In this prior art device, the engaging bodies are constructed as rolling bodies held in apertures of one clutch member and engaged in recesses of the other clutch member by the application of the force of an axial spring.

However, in the known device disadvantages arise because, when the predetermined nominal torque is exceeded, a high percussion energy is converted due to the continuous falling of the driver bodies constructed as balls into the recesses. This percussion energy results, on the one hand, in the generation of unwanted noise and, on the other hand, in significant heating of the ratchet clutch. Moreover, the service life of the torque-limiting clutch is limited because of the continuous percussion. In order to reduce the aforementioned disadvantages, a limit switch has been provided which is able to switch-off an electric drive motor after the nominal torque has been once exceeded.

The overload clutch described above cannot be used for purely mechanical drives, such as the connection of an agricultural implement through a universal joint shaft from the power take-off shaft of a tractor, because the drive cannot be switched off by means of a limit switch in this case.

In another prior art overload clutch known from German Auslegeschrift No. 1,283,040, engaging bodies constructed as balls are held in a separate cage. In this case, the driving as well as the driven clutch member are provided with recesses in which the balls engage for torque transmission. When the predetermined torque is exceeded, the balls roll out of these recesses and, due to the shape of the apertures of the cage, the balls are transferred into a track in which they cannot again fall into the recesses. The disadvantages described above are thereby essentially eliminated.

However, in this prior art device, the force of the spring acts continuously on the driver bodies, even in the floating position, thereby creating a disadvantage. Moreover, the cage must be rotated relative to one of the clutch members for reengaging the overload clutch. A further disadvantage is that the cage supporting the engaging bodies is connected to one of the clutch members through so-called locking elements. As a result, the entire overload clutch consists of a plurality of individual parts which must be moved relative to each other thereby making this clutch very susceptible to trouble.

The object of the invention is to provide an overload clutch for the protection of drive lines which, in the floating or overrunning position, has a minimum of energy conversion, and which, if desired, automatically reingages by a simple reduction of the driving speed. Furthermore, the invention is aimed at providing a clutch which can be shifted into a total floating or overrunning position in special cases of application.

SUMMARY OF THE INVENTION

Briefly, in accordance with the invention the control ring is provided with recesses which correspond to the recesses of one of the driving and driven clutch members, e.g. the clutch sleeve, and the engaging or transmission bodies are supported on the control ring in frictional engagement during torque transmission in such a manner that the control ring, when the predetermined nominal torque is exceeded, is rotatable by the action of the rolling motion of the transmission bodies out of the recesses against the force of a spring acting in the circumferential direction. The recesses of the control ring can thus be brought into an angular position which corresponds to the positions of the apertures into which the transmission bodies are moving.

In the overload clutch of the invention, it is especially advantageous that the clutch consist only of a few individual parts which are movable relative to each other. When the overload clutch is used for driving an agricultural implement through a universal joint shaft from the power take-off shaft of the tractor, an especially advantageous effect is derived if the reengagement of the overload clutch can be effected after the overloading has occurred by a simple reduction of the speed of the power take-off shaft. Accordingly, the operator or the driver of the tractor does not need to leave his seat after each disengagement and does not need to manually reengage the overload clutch. Compared to known ratchet clutches, the overload clutch of the invention provides a substantially reduced ratched effect in the overrunning position.

In a further development of the invention, a spring-loaded catch member which acts in the radial direction is arranged within each aperture with the recesses of the control ring being constructed in such a manner that the transmission bodies are held in the overrunning position in the recesses of the control ring by means of the catch members, with the control ring being locked in the overrunning position by means of an additional catch member.

As a result of this measure, the overload clutch completely shifts into the overrunning position, so that no residual torque is present and no locking effect can occur.

Furthermore, it is possible, if desired, to manually completely disengage the overload clutch. This capability may be desired when more of these load clutches are used in an implement for driving individual lines, and when individual lines are to be taken out of operation.

According to another embodiment of the invention, the engaging bodies are constructed as conical rollers.

Due to the design of the engaging bodies as conical rollers, they have a line contact during torque transmission. Accordingly, larger torques can be transmitted with the same structural size of the overload clutch.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
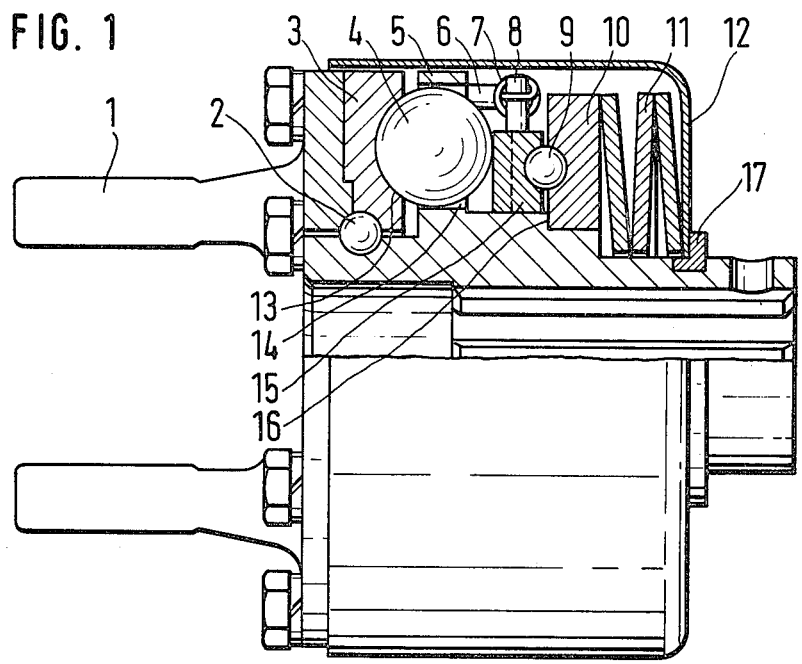
FIG. 1 is a longitudinal section through the overload clutch of the invention.

The overload clutch illustrated in FIG. 1 consists essentially of a driving member or clutch hub 5 and a driven member or clutch sleeve 3 which is rotatably supported on the clutch hub 5 through a bearing 2 and which is nonrotatably connected to a yoke 1. The clutch hub 5 is provided with a radially operatively widened flange in which break-throughs or apertures 14 uniformly distributed over the circumference thereof are arranged for receiving torque transmitting or engaging bodies 4. The annular surface of the clutch sleeve 3 which faces toward the engaging bodies 4 is provided with recesses 13 which correspond to the apertures 14 and into which the engaging bodies 4 can enter for torque transmission. On that side of a widened flange of the clutch hub 5 which faces away from the annular surface of the clutch hub 3, a control ring 15 is arranged which is also provided with recesses 18 which correspond to the apertures 14 of the clutch hub 5.

By means of two circumferential springs 7 which may be constructed as compression or as tension springs and which are supported, on the one hand, on radially extending pins 8 of the control ring and, on the other hand, on axially extending pins 6 which are connected to the clutch hub 5, the control ring 15 is held in a neutral position in such a manner that the recesses 18 of the control ring 15 are held in an offset position relative to the apertures 14 of the clutch hub 5.

On its side facing away from the engaging bodies, the control ring 15 is supported by a support disc 10 through a thrust bearing 9. On the side facing away from the bearings 9, the support disc 10 rests against an axial spring 11 which, in turn, is supported in the axial direction by a limit stop 17.

In the opposite direction, the force of the spring 11 is absorbed by an axial stop 16 through the support disc 10. Accordingly, during standstill of the overload clutch, i.e., when no torque is applied, the engaging bodies 4 lie without force application in the recesses 13 of the clutch sleeve.

When a torque is applied to the clutch, the engaging bodies 4 attempt to yield out of the recesses 13 in the direction toward the control ring 15 and they are then supported by the axial spring 11 through the control ring 15, the thrust bearing 9 and the support disc 10.

Figure 2:
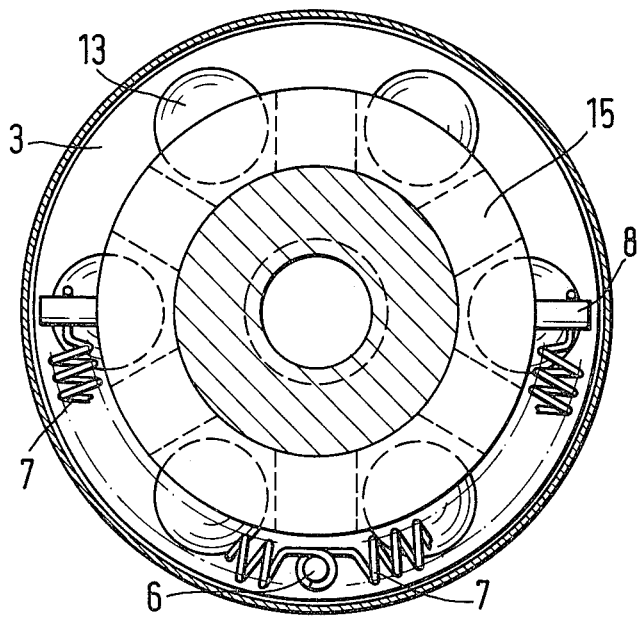
FIG. 2 is a cross section of the overload clutch according to FIG. 1.

FIG. 2 shows the connection of the springs 7 which act in a circumferential direction and are supported, on the one hand, on a pin 6 which is arranged on the clutch and, on the other hand, on pins 8 which are arranged on the control ring.

Figure 3:
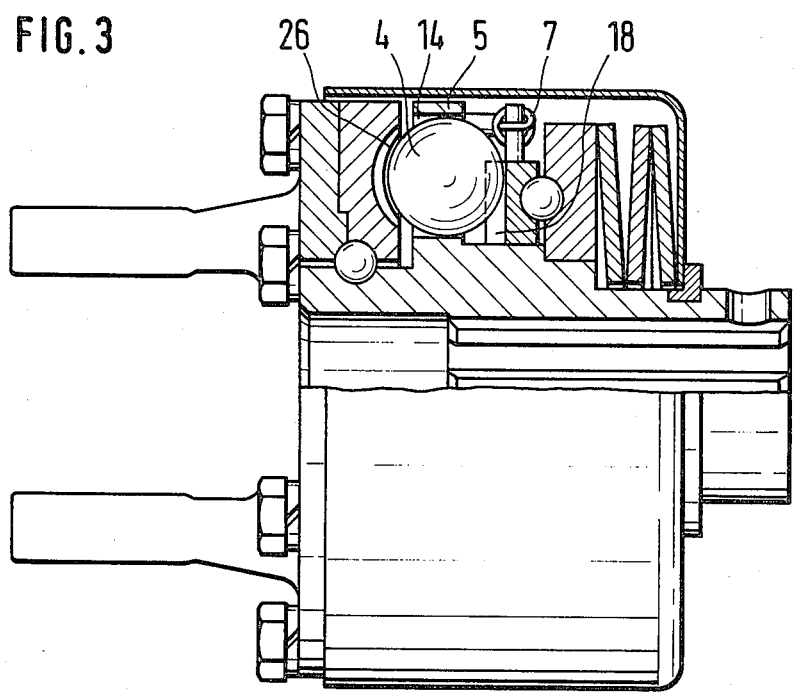
FIG. 3 is a longitudinal section taken through the overload clutch in the overrunning position.

FIG. 3 shows the overload clutch after shifting into the floating or overrunning position. The engaging bodies 4 which are in frictional engagement with the control ring 15 when a torque is applied to the overload clutch roll out of the recesses 13 of the clutch sleeve 3 when an overload occurs and, due to their rolling motion, turn the control ring 15 against the force of the circumferential springs 7 in such a manner that the recesses 18 of the control ring 15 assume a position which corresponds to the apertures 14 of the clutch hub 5. As a result, the engaging or transmission bodies 4 which in the meantime have left the recesses 13 of the clutch sleeve can fall into the recesses 18 of the control ring 15. Since the force of the spring 11 is absorbed on both sides by the stops 16 and 17, the engaging bodies 4 are now lying without force application in the recesses 18 of the control ring 15 and roll in the tracks 26 when the clutch hub 5 rotates further.

Since, during shifting into the overrunning position, the control ring 15 has been turned off its neutral position which is determined by the springs 7, the control ring 15 once again attempts to assume this position because of the force of the springs. However, as long as the drive, and with it the hub 5, are rotating at a high speed, the engaging bodies 4 are unable to fully return into the recesses 13 of the clutch sleeve which recesses assure torque transmission. The overload clutch now rotates in the floating or overrunning position with a significantly reduced ratchet effect.

Automatic reengagement of the overload clutch can be effected by a simple reduction of the driving speed. The clutch will return into the torque-transmitting position as soon as the relative movement of the engaging bodies 4 past the recesses 13 is slowed down to such an extent that the force of the spring 7 is sufficient to fully press the engaging bodies 4 into the recesses 13.

Figure 4:
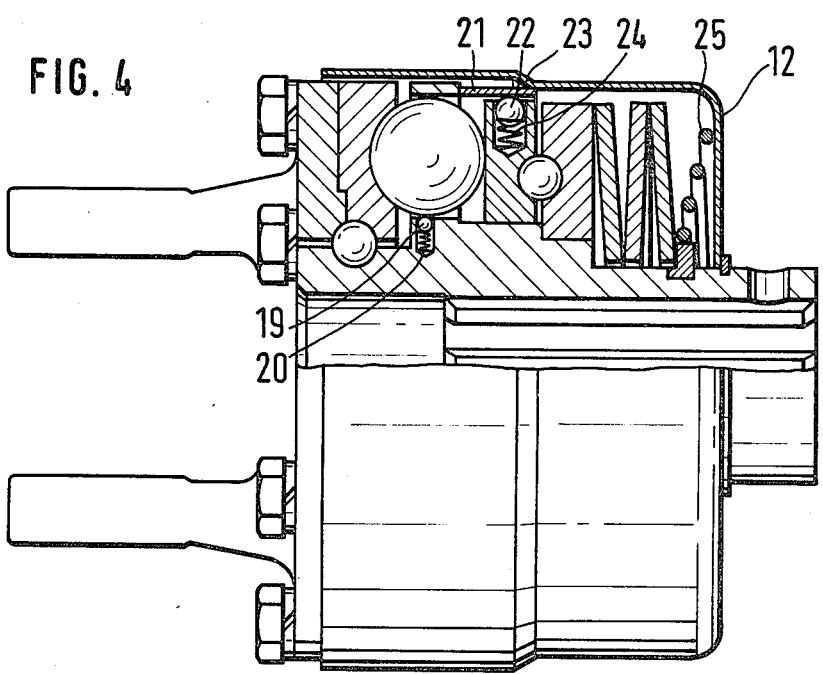
FIG. 4 is a longitudinal section through an overload clutch having a disengaging device and a catch member for the engaging bodies.
Figure 5:
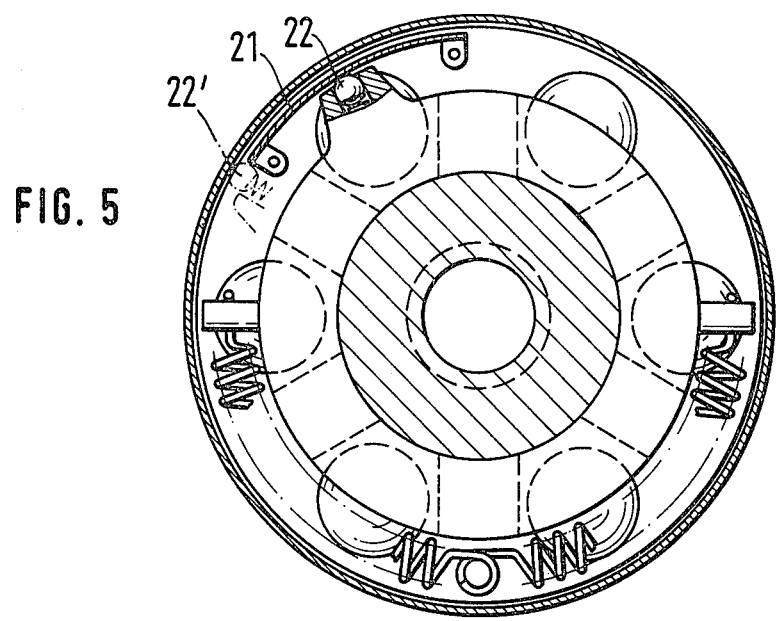
FIG. 5 is a cross section through the overload clutch according to FIG. 4.

FIGS. 4 and 5 show an overload clutch which, after a torque overload, is able to completely shift into the floating position, i.e., it then rotates without any ratchet effect. This is especially advantageous when the overload clutch is mounted in a drive line which is not constantly supervised.

In the overload clutch illustrated in FIGS. 4 and 5, within the clutch hub 5 there is arranged a catch member assigned to each aperture, the catch member consisting of a ball 19 and a spring 20 which acts on the balls in radial direction. Furthermore, on the outer circumference of the control ring 15 an additional catch member with a ball 22 and a spring 24 acting on this ball 22 is provided.

In the torque-transmitting position, the catch ball 22 bears radially outwardly against a locking lug 21. If, at the beginning of an overload of the clutch, the control ring 15 is turned out of its neutral position, the ball 22 assumes the locking position which is indicated in dash-dotted lines 22'. In this case, due to the fact that the ball 22 has contact, the control ring is held in the locking position 22' behind the locking lug 21 in the floating position.

For returning the disengaging clutch into the driving position, there is provided on a cover housing 12 surrounding the disengaging clutch a shoulder 23 which, as soon as the cover housing 12 is moved against the force of a spring 25 in the direction toward the clutch sleeve 3, pushes the stop ball 22 beneath the locking lug 21 so that the control ring 15 can once again jump back into the neutral position.

Figure 6:
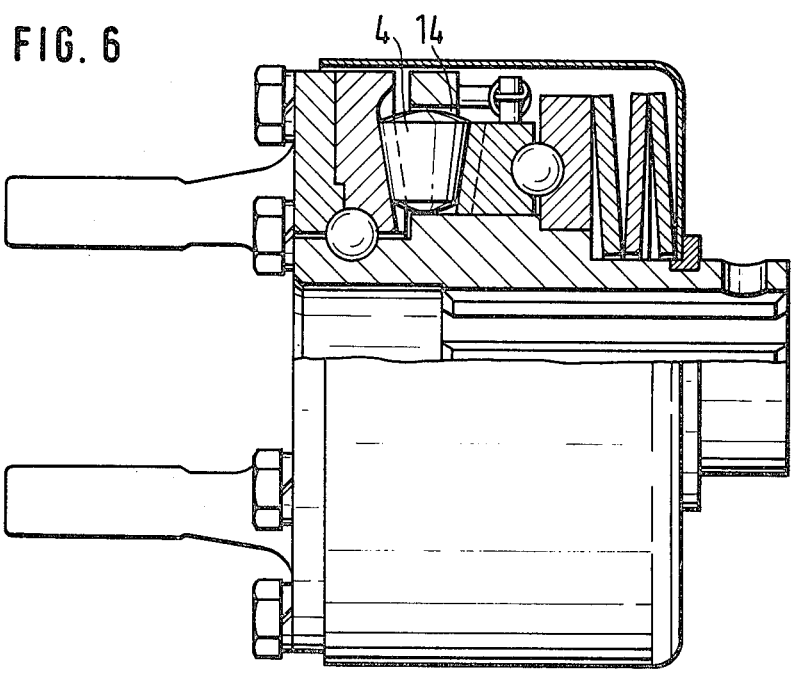
FIG. 6 is a longitudinal section through the overload clutch wherein the driver bodies are constructed as conical rollers.

FIG. 6 shows an overload clutch in which the engaging bodies 4 are constructed as tapered rollers. This embodiment has the advantage that a line contact occurs between the engaging bodies and the other clutch components so that the clutch can be designed for larger torques without increasing the dimensions of the clutch.

Figure 7:
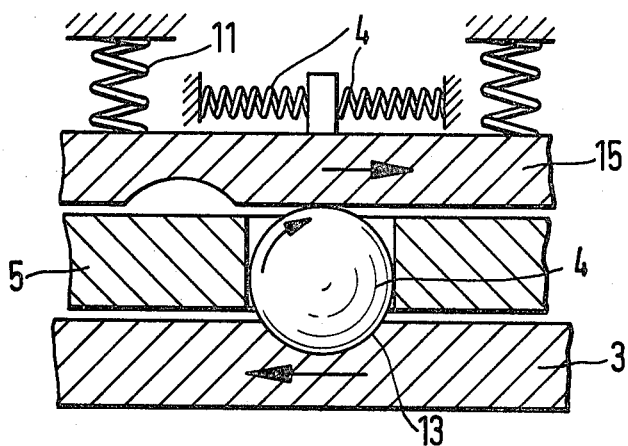
FIGS. 7, 8 and 9 are partial sectional views showing the sequence of movements of the overload clutch during the transition from the torque-transmitting position into the overrunning position.
Figure 8:
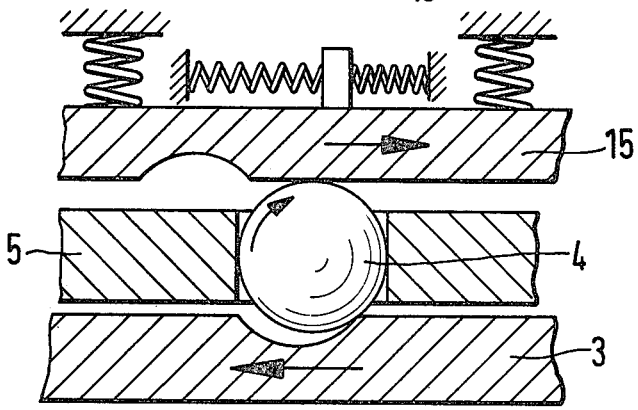
Figure 9:
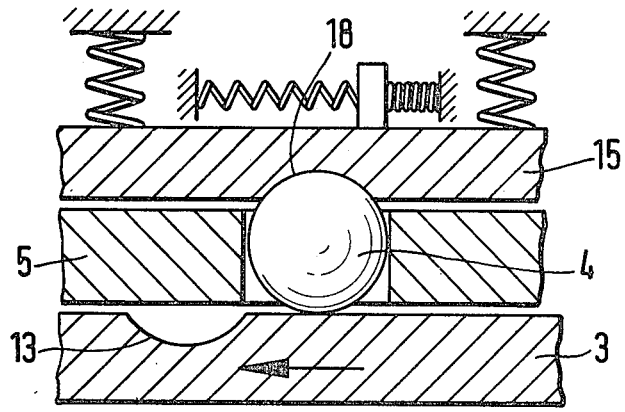

In FIGS. 7, 8 and 9, the transition of the overload clutch from the torque-transmitting position into the floating or overrunning position is illustrated. In FIG. 7, the over-load clutch is at the beginning of the shifting movement in the case of an overload. Due to the oppositely directed torques of the clutch sleeve 3 and the clutch hub 5, the engaging bodies 4 are rolled out of the recesses 13 of the clutch sleeve 3, the engaging bodies 4 thus rolling with their back sides on the control ring 15 and moving the latter from its neutral position, as shown in FIG. 8, toward the floating position. In FIG. 9, the shifting movement is concluded, i.e., the engaging bodies 4 are fully rolled out of the recesses 13 of the clutch sleeve 5 and they have entered the recesses 18 of the control ring 15. The overload clutch has now been shifted to the floating or overrunning position.

While specific embodiments of the invention have been shown and described in detail to illustrate the application of the inventive principles, it will be understood that the invention may be embodied otherwise without departing from such principles.

What is claimed is:

1. An overrunning clutch comprising: a driving member; a driven member; clutch engagement members; aperture means extending through one of said driving and driven members and having said engagement members operably supported therein; first recess means formed in the other of said driving and driven members; control ring means having second recess means formed therein and adapted to be angularly moved between a first position where said engagement members are out of angular alignment with said second recess means, and a second position where said second recess means are brought into angular alignment with said engagement members; said engagement members being located between said control ring means and said other of said driving and driven members; axial spring means urging said control ring means against said engagement members, and urging said engagement members against said other of said driving and driven members; and circumferential spring means urging said control ring means toward said first position; said engagement members being held in torque transmitting engagement within said first recess means where said clutch is operated to transmit torque below a predetermined nominal value; said control ring means being moved against said circumferential spring means from said first position to said second position when said clutch is operated above said predetermined nominal value thereby to effect disengagement of said engagement members with said first recess means to bring said clutch into an overrunning condition.

2. A clutch according to claim 1 wherein said engagement means are in frictional engagement with said control ring means by operation of said axial spring means and wherein when said predetermined nominal torque is exceeded, said control ring means is moved from said first position to said second position by a rolling motion of said engagement members moving out of said first recess means.

3. A clutch according to claim 1 further including stop means for limiting the action of said axial spring means.

4. A clutch according to claim 1 wherein said circumferential spring means are engaged between said control ring means and said one of said driving and driven members to apply a circumferentially directed spring force therebetween.

5. A clutch according to claim 4 wherein said control ring means comprises first pin means extending radially therefrom and wherein said one of said driving and driven members comprises second pin means extending axially therefrom, with said circumferential spring means being engaged between said first and said second pin means.

6. A clutch according to claim 1 wherein said engagement members are retained angularly fixed relative to said one of said driven and driving members within said aperture means while being permitted to effect a rolling motion therein, with said rolling motion of said engagement members being transmitted to said control ring means to effect movement of said control ring means from said first to said second position when said predetermined nominal torque value is exceeded.

7. A clutch according to claim 1 wherein said second recess means are in angular alignment with said aperture means when said control ring means is in said second position.

8. A clutch according to claim 1 wherein said circumferential spring means operate to hold said second recess means out of angular alignment with said aperture means wherein said engagement members are contained, said control ring means thereby being in said first position, and wherein said second recess means are brought into angular alignment with said aperture means within which said engagement members are contained when said control ring means is in said second position.

9. A clutch according to claim 1 comprising spring-loaded catch means acting in a radial direction within said aperture means, said second recess means being constructed in such a manner that said engagement members are held in the clutch overrunning position in said second recess means by means of said catch means and that said control ring means can be locked in said second position through an additional catch means acting in connection with a locking lug.

10. A clutch according to claim 1 wherein said engagement members are spherical balls.

11. A clutch according to claim 1 wherein said engagement members are conical rollers.

* * * * *